Patented Nov. 4, 1952

2,616,922

UNITED STATES PATENT OFFICE 2,616,922

QUATERNARY SALTS

Eugene L. Ringwald and George E. Ham, Dayton, Ohio, assignors, by mesne assignments, to The Chemstrand Corporation, a corporation of Delaware No Drawing. Application October 25, 1949, Serial No. 123,524

8 Claims. (Cl. 260—482)

This invention relates to a new class of polymerizable olefinic monomers useful in the preparation of polymeric resinous compositions. More specifically the invention relates to polymerizable quaternary salts of allyl and methallyl esters.

The primary purpose of this invention is to provide a new class of monomers which are useful in the preparation of dyeable polymers. A further purpose of this invention is to provide allyl and methallyl esters which have useful quaternary ammonium substituents. A still further purpose of this invention is to provide a method of reacting the allyl and methallyl esters of halo-substituted acetic acid to develop dye affinity characteristics.

In accordance with this invention it has been found that the allyl and methallyl esters of haloacetic acid may be reacted with tertiary amines whereby a new and valuable class of compositions may be formed. The new compounds which are actively polymerizable may be represented by the following structural formula:

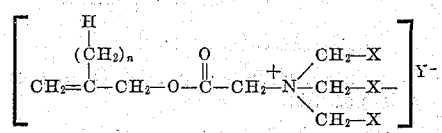

wherein $n$ is a small whole number from zero to one, inclusive, X is a radical of the group consisting of alkyl radicals having up to four carbon atoms, hydroxy alkyl radicals having up to four carbon atoms and hydrogen, and Y is a halogen of the group consisting of chlorine, iodine and bromine.

The new compounds may be prepared from chloroacetic acid, iodoacetic acid or bromoacetic acid and either allyl or methallyl alcohol by simple esterification reactions, preferably in the presence of an esterification catalyst. The allyl or methallyl chloroacetates are thereafter reacted with an appropriate tertiary aliphatic amine. The latter reaction is conducted in the presence of a solvent for both reactants, for example benzene, toluene, xylene, dioxane, ether, acetone, ethylene dichloride, N,N-dimethylformamide, butyrolactone, and other organic liquids in which the reactants are soluble. The reactions generally may be effected at room temperature although occasionally the mixtures may require warming or moderate heating to initiate or accelerate the reaction. Since the reactions are exothermic it is often necessary or desirable to cool the reaction mass to prevent an excessive reaction rate and the decomposition of the product and the lowered yield. The quaternary salts so prepared are usually insoluble in the solvent and are precipitated during the reaction. The quaternary salts which are soluble in the solvents may often be separated by concentration and crystallization at low temperatures.

In the practice of this invention either chloroacetic acid, iodoacetic acid or bromoacetic acid may be used. The esterification with allyl or methallyl alcohol then produces allyl chloroacetate, methallyl chloroacetate, allyl bromoacetate or methallyl bromoacetate. Suitable tertiary amines for practicing the invention are trimethylamine, triethylamine, tributylamine, triamylamine, dimethylaminoethanol, and other hydroxy alkyl and mixed hydroxy alkyl amines wherein the alkyl radicals have up to five carbon atoms.

The new polymerizable quaternary salts may also be prepared by indirect methods, for example by reacting an α-chloroacetic acid derivative with a secondary amine and thereafter neutralizing the resulting amine salt to form a dialkylaminoacetate derivative. The latter compound can then be reacted with an alkyl halide to form the quaternary ammonium salt. The α-chloroacetic acid derivative may be the allyl or methallyl ester or the esterification or ester interchange with the unsaturated alcohol may be performed on the intermediate tertiary amine or after the quaternary ammonium compound has been formed.

This method is a convenient and inexpensive method for preparing quaternary ammonium derivatives having different substituents in the various positions. Thus allyl or methallyl α-chloroacetate may be reacted with ethylmethylamine, and the tertiary aminoacetic acid ester may then be treated with butyl chloride, whereby the three different alkyl substituents will be found in the resulting product.

The new compounds prepared in accordance with this invention are polymerizable and may be copolymerized with a wide variety of olefinic monomers, for example acrylonitrile, methacrylonitrile, methyl acrylate and other alkyl acrylates, methyl methacrylate and other alkyl methacrylates, vinyl acetate and other vinyl esters of carboxylic acids, vinyl chloride and vinylidene chloride.

Further details of the practice of this invention are set forth with respect to the following examples.

Example 1

A glass reaction vessel was charged with 250 mls. of N,N-dimethylacetamide and 135.5 grams of allyl chloroacetate were dissolved therein. After the solution was cooled on an ice bath a cold solution of 65 grams of trimethylamine in 250 grams of N,N-dimethylacetamide was gradually added thereto while maintaining the reaction mixture at approximately room temperature by immersion in an ice bath. After the reactants had been combined the reaction mass was allowed to stand for one hour in contact with the ice bath. The heavy precipitate which formed during the reaction was separated by filtration, washed with N,N-dimethylacetamide and finally with a mixture of benzene and hexene. The crystalline product recovered was identified as (carboallyloxymethyl) trimethylammonium chloride.

Example 2

The procedure of the preceding example was duplicated except that triethylamine was used in place of trimethylamine. A substantial yield of a crystalline compound was obtained and identified as (carboallyloxymethyl) triethylammonium chloride.

Example 3

The procedure of Example 2 was duplicated, except that allyl α-bromoacetate was used in place of allyl chloroacetate. A 94.4 percent yield of crystalline product was obtained and identified as (carboallyloxymethyl) triethylammonium bromide.

Example 4

The procedure of Example 1 was repeated, except that dimethylaminoethanol was used in place of trimethylamine. The product recovered was identified as (carboallyloxymethyl) dimethyl (β-hydroxymethyl) ammonium chloride.

Example 5

The procedure of Example 1 was repeated, except that tributylamine was used in place of trimethylamine. The compound produced was identified as (carboallyloxymethyl) tributylammonium chloride.

We claim:

1. A compound having the structural formula

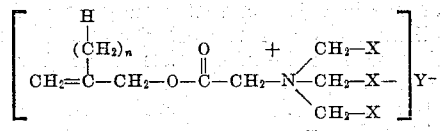

wherein $n$ is a small whole number from zero to one, inclusive, X is a radical of the group consisting of alkyl radicals having up to four carbon atoms, hydroxy alkyl radicals having up to four carbon atoms and hydrogen, and Y is a halogen of the group consisting of chlorine, iodine and bromine.

2. (Carboallyloxymethyl) trimethylammonium chloride.

3. (Carboallyloxymethyl) triethylammonium chloride.

4. (Carbomethallyloxymethyl) trimethylammonium chloride.

5. A method of preparing polymerizable quaternary salts, which comprises reacting a compound having the structural formula:

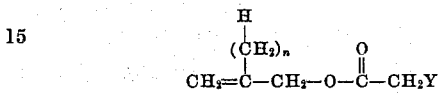

wherein $n$ is a whole number from zero to one, inclusive, and Y is a halogen of the group consisting of bromine, iodine and chlorine, with a compound having the structural formula:

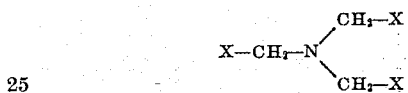

wherein each X radical is one of the group consisting of hydrogen, alkyl radicals having up to four carbon atoms and hydroxy alkyl atoms having up to four carbon atoms while cooling the reaction mixture.

6. A method of preparing (carboallyloxymethyl) trimethylammonium chloride, which comprises reacting allyl chloroacetate with trimethylamine while cooling the reaction mixture.

7. A method of preparing (carboallyloxymethyl) triethylammonium chloride, which comprises reacting allyl chloroacetate with triethylamine while cooling the reaction mixture.

8. A method of preparing (carbomethallyloxymethyl) triethylammonium chloride, which comprises reacting methallyl chloroacetate with trimethylamine while cooling the reaction mixture.

EUGENE L. RINGWALD.
GEORGE E. HAM.

REFERENCES CITED

The following references are of record in the file of this patent:

UNITED STATES PATENTS

| Number | Name | Date |
| --- | --- | --- |
| 2,087,565 | Balle | July 20, 1937 |
| 2,367,878 | Lee | Jan. 23, 1945 |

FOREIGN PATENTS

| Number | Country | Date |
| --- | --- | --- |
| 543,556 | Germany | Feb. 6, 1932 |